United States Patent Office 3,794,619
Patented Feb. 26, 1974

3,794,619
PROCESS FOR THE PREPARATION OF BIS(2,3-EPOXY - 2 - METHYLPROPYL) ETHER TYPE EPOXY RESIN
Koichi Hasegawa and Hisashi Sekiguchi, Chiba, and Hiroshi Zaitsu, Ichihara, Japan, assignors to Dainippon Ink and Chemicals, Incorporated, Tokyo, Japan
No Drawing. Filed Dec. 15, 1971, Ser. No. 208,385
Claims priority, application Japan, Dec. 17, 1970, 45/112,498
Int. Cl. C08g 30/04
U.S. Cl. 260—47 EP                                      6 Claims

ABSTRACT OF THE DISCLOSURE

A process for the preparation of bis(2,3-epoxy-2-methylpropyl)ether type epoxy resin of dehydric phenol, characterized by the concurrent usage, as the starting dihydric phenol, of less than 10 mol percent of nucleus halogen-substituted, or -unsubstituted, symmetric dihydric phenol and at least 10 mol percent of specific asymmetric dihydric phenol. The epoxy resin of this invention exhibits excellent melt-flowability when thermally melted and during processing, as well as excellent solubility, and also has very good flowability and homogeneity in the solution state.

---

This invention relates to a process for the preparation of a novel epoxy resin. More particularly, the invention relates to a process for the preparation of a bis(2,3-epoxy-2-methylpropyl)ether type epoxy resin of dihydric phenol, characterized by the concurrent usage, as the starting dihydric phenol, of less than 10 mol percent of a nucleus halogen-substituted, or -unsubstituted, symmetric dihydric phenol and at least 10 mol percent of later-described, specific asymmetric dihydric phenol. The epoxy resin prepared in accordance with this invention exhibits excellent melt-flowability when thermally melted and during processing, as well as excellent solubility, and also has very good flowability and homogeneity in the solution state.

The high utility of the epoxy resin which is the diglycidyl ether of 2,2-bis(4-hydroxyphenyl)propane (which may be hereinafter referred to as bisphenol A) is known of old, and by far the greatest part of the currently utilized epoxy resins belong to this type. That is, the specified type of epoxy resin has wide utilities for laminates, molding materials, adhesives, etc. The demand therefore is still rapidly increasing, due to its excellent properties, particularly high adherability, corrosion resistance, chemical resistance, and electrical properties.

Also as another type of epoxy resin prepared from bisphenol A, the resin of the general formula below, which is the bis(2,3-epoxy-2-methylpropyl)ether of bisphenol A, is known.

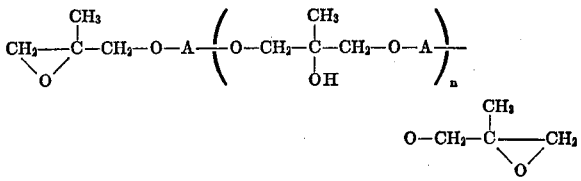

in which A stands for the residue of bisphenol A, and $n$ is zero or an integer not less than 1.

This (2,3-epoxy-2-methylpropyl)ether type epoxy resin, however, has scarcely been the subject of studies among the experts of the art, and its properties are not yet very well known. Whereas, as a part of our research works for effective utilization of isobutene in the B—B fraction of distillate side-produced of cracking of naphtha, we made concentrative studies on the characteristics of this type of epoxy resin which can be manufactured from 2-methylepichlorohydrin derivable from isobutene. As a result, it has been confirmed that this type of resin is less reactive than the aforesaid glycidyl ether type epoxy resin, due to the lower ring-opening activity of its epoxy radicals, and therefore, is occasionally more effective than the glycidyl ether type resin, depending on the type of hardening agent, intended utility and object. For example, the resin is highly valuable for use in molding materials, pre-preg, coating powders, large size casting materials, etc.

Applicants further studies revealed, however, that the resin also has certain inherent drawbacks. That is the relatively high molecular weight (approximately 1,000 or above), glycidyl ethers of bisphenol A, e.g., "Epon 1001, 1004, 1007, and 1009," etc. (products of Shell Chemicals, Co., Netherlands), show no substantial reduction in workability as will interfere with their practical usage, in spite of their high molecular weights; whereas the (2,3-epoxy-2-methylpropyl)ether type epoxy resin exhibits unique behavior not predictable from the general behavior of glycidyl ether type resin, when the "$n$" in the above-given general formula exceeds 2. These unpredictable characteristics are manifested by appreciable reduction in melt-flowability and solubility in the solvent, as well as rapid rise in melting temperature. Such tendency is particularly conspicuous in case of epoxy resin derived from nucleus halogen-substituted bisphenol A. These unique characteristics diminish the effective use of the resin. For example, they serve as the cause of such troubles as poor flowability and solidification during the resin preparation or when taking resin out. Or, when the resin is used as a coating or impregnating solution for pre-preg, it is impossible to prepare a solution therefrom. The resin also exhibits poor flowability and wettability at curing process, or causes deterioration in quality and properties of products, when used as molding materials, coating powders, or adhesives.

Accordingly, the object of this invention is to provide (2,3-epoxy-2-methylpropyl) ether type epoxy resins which will not possess the above drawbacks.

We discovered that an epoxy resin prepared by the concurrent use of less than 10 mol percent of symmetric dihydric phenol (e.g., bisphenol A) and at least 10 mol percent of a later-specified asymmetric dihydric phenol, as the dihydric phenol component, in the synthesis a bis (2,3-epoxy-2-methylpropyl)ether type epoxy resin of dihydric phenol by condensation of 1,2-epoxy-3-halobutane with dihydric phenol, well meets the foregoing object of this invention.

It is important for the object of this invention to co-condense with 1,2-epoxy-3-halobutane, two types of dihydric phenol at such ratios that less than approximately 10 mol percent of the total phenolic residue in the epoxy resin molecules is a symmetrics dihydric phenolic residue, and also at least approximately 10 mol percent is the specific asymmetric dihydric phenolic residue. For example, the object of this invention cannot be achieved by the mixtures of an epoxy resin obtained by the reaction of symmetric dihydric phenol with 1,2 - epoxy - 3 - halobutane, and another resin obtained by the reaction of specific asymmetric dihydric phenol with 1,2 - epoxy - 3-halobutane.

The "asymmetric dihydric phenol" useful for the invention include the following dihydric phenols; (A') pyrocatechol, nucleus substituted pyrocatechol, resorcinol, nucleus substituted resorcinol, bis(hydroxyphenyl) methane and nucleus substituted bis(hydroxyphenyl) methane; (A'') dihydroxynaphthalene and dihydroxyanthracene; and (A''') the compounds of the general formulas:

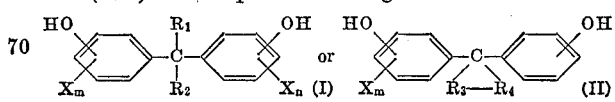

in which $R_1$ and $R_2$ are selected from the group consisting of a hydrogen atom, alkyl, aryl and alkylaryl radicals, respectively, and are mutually different; $-R_3-R_4-$ is an alkylene radical; X and Y are each selected from the group consisting of alkyl and alkoxy radicals and halogen atoms; and $m$ and $n$ are zero or an integer of 1–4, respectively.

Among the above asymmetric dihydric phenols of group (A'''), those particularly preferred have the $R_1$ and $R_2$ selected from the group consisting of hydrogen atoms, alkyl radicals of up to 8 carbons, monocyclic aryl radicals, and monocyclic alkylaryl radicals containing the alkyl radicals of up to 8 carbons, respectively; $-R_3-R_4$ which is an alkylene radical of 4 or 5 carbons forming cyclopentane or cyclohexane; and X and Y selected from the group consisting of alkyl radicals of up to 8 carbons, alkoxy radicals of up to 8 carbons, and chlorine and bromine atoms, respectively.

Specific examples of particularly preferred asymmetric dihydric phenol include: pyrocatechol, methylcatechol, tert.-butylcatechol, ditert.-butylcatechol, octylcatechol, chlorocatechol, resorcinol, methylresorcinol, tert.-butylresorcinol, octylresorcinol; bis(4-hydroxyphenyl)methane, bis(2-hydroxyphenyl)methane, 2-hydroxyphenyl - 4 - hydroxyphenylmethane, 1,1-bis(4-hydroxyphenyl) ethane, 2,2-bis(4 - hydroxyphenyl) butane, 2,2-bis(4 - hydroxyphenyl)pentane, 2,2-bis(4-hydroxyphenyl)hexane, 2,2-bis-(4-hydroxyphenyl)octane, $\alpha,\alpha$-bis(4 - hydroxyphenyl)ethylbenzene, 1,1-bis(4-hydroxyphenyl)cyclopentane, 1,1-bis-(4-hydroxyphenyl)cyclohexane; 1,6 - dihydroxynaphthalene and 1,8-dihydroxyanthracene.

According to the subject process, the asymmetric dihydric phenol may be used singly, or in optional combination of more than one phenol. Such wide range of selectability allows the preparation of products of various characteristics suitable for the intended utility of the resin according to the subject process, resulting in a great industrial advantage.

The "symmetric phenol" to be concurrently used with those asymmetric dihydric phenols according to the subject process includes bisphenol A, i.e., 2,2-bis(4-hydroxyphenyl)propane, and bisphenol S, i.e., 2,2-bis(4-hydroxyphenyl)sulfone, and their nucleus halogen substituted compounds. Specific examples of the nucleus-substituted bisphenol A and S include bisphenol A and S of which nuclei are substituted with chlorine and bromine atoms, such as 2,2-bis(3,5-dichloro-4-hydroxyphenyl)propane, 2,2-bis(3,5-dibromo - 4 - ydroxyphenyl)propane, 2,2-bis-(3,5-dichloro-4-hydroxyphenyl)sulfone, and 2,2-bis(3,5-dibromo-4-hydroxyphenyl)sulfone, etc.

Also the "1,2-epoxy-3-haloisobutane" used in the subject process signifies, for example, 1,2-epoxy-3-chloroisobutane, and 1,2-epoxy-3-bromoisobutane.

In the preferred embodiment of this invention, either one of the symmetric dihydric phenols and asymmetric dihydric phenols is reacted with 1,2-epoxy-3-haloisobutane in an ordinary manner to form the first stage epoxy resin, which is then co-condensed with the other dihydric phenol by a polyaddition reaction, to form a second stage epoxy resin of still higher molecular weight. More specifically, the above method can be practiced by either of the following two embodiments.

According to the first embodiment, first bis(2,3-epoxy-2-methylpropyl)ether of a symmetric dihydric phenol, i.e., the epoxy resin of the general formula,

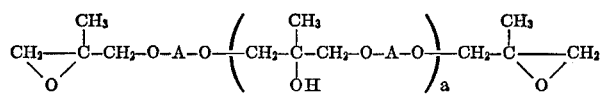

(in which A is the residue of bisphenol A or its nucleus halogen substituted compound, and $a$ is an integer), is made from a symmetric dihydric phenol and 1,2-epoxy-3-haloisobutane; and then the epoxy resin is co-condensed with at least one asymmetric dihydric phenol of the amount as will provide not more than one phenolic hydroxyl group per epoxy radical, by a polyaddition reaction, to form the desired epoxy resin of still higher molecular weight. In this case, the final product resin can be expressed by the general formula below:

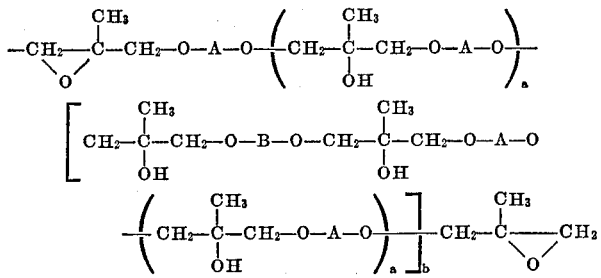

(in which B represents the residue of one or more of the already specified asymmetric dihydric phenols, $b$ stands for an integer not containing zero, and A and $a$ have the already given definitions).

If desired, the epoxy resin can be further subjected to polyaddition reaction with symmetric dihydric phenol, and then with asymmetric dihydric phenol, successively.

According to the second embodiment, at first the bis-(2,3-epoxy-2-methylpropyl)ether of asymmetric dihydric phenol, i.e., the epoxy resin of general formula,

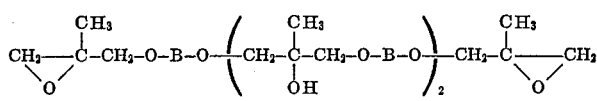

(in which the definitions of symbols are the same as the foregoing), is formed an asymmetric dihydric phenol and 1,2-epoxy-3-haloisobutane, and then the epoxy resin is co-condensed with a symmetric dihydric phenol in a manner similar to the first embodiment, to form the desired epoxy resin of still higher molecular weight. In this case, the final product resin is the compound expressed by the general formula below:

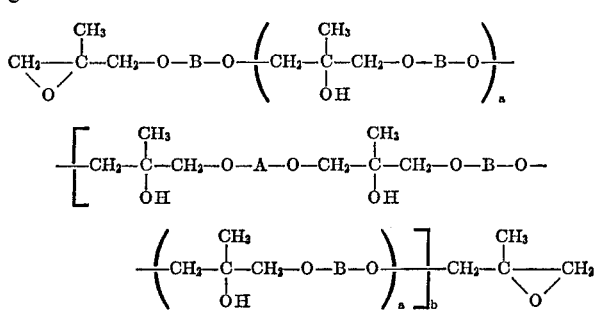

(in which the definitions of the symbols are the same as the foregoing).

If desired, the above epoxy resin can be further subjected to a polyaddition reaction with an asymmetric dihydric phenol, and then with a symmetric dihydric phenol, successively.

The epoxy resin of improved melt-flowability and solubility as intended by the invention must contain less than approximately 10 mol percent of a symmetric dihydric phenolic residue to the total phenolic residues in the molecules, and also at least approximately 10 mol percent of the asymmetric dihydric phenolic residues. From this standpoint, the second embodiment is very effective, because the epoxy resin prepared thereby invariably contains at least 50 mol percent of the asymmetric dihydric phenolic residues. Obviously, the first embodiment is equally effective, so far as the degree of condensation of the first stage epoxy resin is not excessively advanced.

Furthermore, it should be obvious that the first stage epoxy resin in either of the embodiments may be that prepared through procedures different from those above.

According to the subject process, the objective epoxy resin can be formed by a one step reaction of a mixture of a symmetric dihydric phenol and an asymmetric dihydric phenol, with 1,2-epoxy-3-haloisobutane, as the third embodiment. It should be noted, however, that for effective practice of this third embodiment, the asymmetric dihydric phenol component must be used a large excess of the symmetric dihydric phenol component, otherwise the high probability is that the epoxy resin based solely on the symmetric dihydric phenol is formed, and the object of this invention cannot be achieved. Thus the advantages of the first and second embodiments are apparent, because whereby the asymmetric dihydric phenol can be co-condensed with certainty.

The co-condensation reaction in the foregoing embodiments can be performed at 80–250° C. in the presence or absence of a solvent. The presence of a catalyst is not essential, but such compounds as metal hydroxides, inorganic or organic alkali metal salts, tertiary amines, quaternary ammonium hydroxides, quarternary ammonium salts, organophosphorus compounds, etc., may be used as the catalyst.

The epoxy resin obtained in accordance with the subject process not only exhibits excellent melt-flowability by itself, but also retains good flowability as compositions mixed with hardening agents, or as B-stage compositions, and gives products of good moldability, adhesion, wettability, surface flowability, impregnating property and permeability. The resin also has excellent solubility in solvents, and is highly useful as coatings, pre-preg, and modifiers of other various resins.

Hereinafter the invention will be explained in further detail, with reference to strictly non-limitative examples.

In the examples, the respective quantitative ratios of asymmetric dihydric phenols (mol percent) to the total dihydric phenol component is as below:

| Example No.: | Mol percent | Example No.: | Mol percent |
|---|---|---|---|
| 1 | 30 | 15 | 30 |
| 2 | 38 | 16 | 30 |
| 3 | 30 | 17 | 57 |
| 4 | 38 | 18 | 30 |
| 5 | 30 | 19 | 38 |
| 6 | 27 | 20 | 38 |
| 7 | 41 | 21 | 30 |
| 8 | 57 | 22 | 27 |
| 9 | 30 | 23 | 30 |
| 10 | 30 | 24 | 54 |
| 11 | 38 | 25 | 30 |
| 12 | 30 | 26 | 30 |
| 13 | 38 | 27 | 30 |
| 14 | 27 | 28 | 29 |

EXAMPLE 1

An epoxy resin I of 508 epoxy equivalents having a melting point of 68° C. (as determined by the rosin ring-ball method, the method being applied to the melting point measurements in all of the following examples) was prepared by reacting 840 g. of bisphenol A-bis(2,3-epoxy-2-methylpropyl) ether type resin of 210 epoxy equivalents (which will be hereinafter referred to as epoxy resin A) with 110 g. of pyrocatechol, in the presence of 0.05 g. of sodium hydroxide, at 180° C. The product resin was well soluble in widely used solvents such as ketone-, ester-, and ethylene glycol monoether-type solvents, as well as in benzene, butylcarbitol, dioxane, and tetrahydrofuran, etc. The resin also exhibited excellent flowability at 120° C., which did not deteriorate after the lapse of time.

EXAMPLE 2

An epoxy resin II of 860 epoxy equivalents having a metling point of 93° C. was obtained by reacting 1260 g. of epoxy resin A with 220 g. of pyrocatechol in the presence of 0.02 g. of lithium hydroxide, at 180° C. This resin showed high solubility in the solvents mentioned in Example 1, and good flowability at 120° C. which did not deteriorate after the lapse of time.

EXAMPLE 3

An epoxy resin III of 485 epoxy equivalents having a melting point of 70° C. was obtained by reacting 840 g. of the epoxy resin A and 110 g. of resorcinol, in the presence of 0.03 g. of potassium hydroxide, at 180° C. This resin again showed the favorable properties similarly to the resin I of Example 1.

EXAMPLE 4

An epoxy resin IV of 805 epoxy equivalents having a melting point of 94° C. was obtained by reacting 1260 g. of epoxy resin A with 220 g. of resorcinol, in the presence of 0.2 g. of dimethylbenzylamine, at 180–200° C. This resin showed the properties similar as of resin I of Example 1.

EXAMPLE 5

An epoxy resin V of 520 epoxy equivalents having a melting point of 73° C. was obtained by reacting 840 g. of epoxy resin A with 176 g. of tert.-butylcatechol, in the presence of 0.02 g. of lithium acetate, at 180–200° C. This resin was well soluble in toluene and xylene, besides those solvents mentioned in Example 1. Its behavior at 120° C. was similar to that of the products of foregoing examples.

EXAMPLE 6

970 grams of the epoxy resin III obtained in Example 3 was mixed with 114 g. of bisphenol A, and heated at 180–200° C. without the addition of reaction accelerator. Thus an epoxy resin VI of 1210 epoxy equivalents having a melting point of 110° C. was obtained. This resin showed high solubility in ordinarily used solvents such as ketone-, ester-, ethylene glycol monoether-, and diethylene glycol monoether-type solvents, as well as in dioxane, tetrahydrofuran, and dimethylformamide. The resin also had good flowability at 120° C., which did not deteriorate after the lapse of time.

EXAMPLE 7

An epoxy resin VII of 1152 epoxy equivalents having a melting point of 108° C. was obtained by mixing 970 g. of epoxy resin III with 100 g. of bis(4-hydroxyphenyl) methane, and heating the mixture to 180–200° C. This resin showed a property similar to those of the product resin of Example 6.

EXAMPLE 8

An epoxy resin VIII of 1710 epoxy equivalents having the melting point of 128° C. was obtained by reacting 900 g. of resorcinol-bis(2,3-epoxy-2-methylpropyl)ether type resin of 150 epoxy equivalents with 570 g. of bisphenol A, in the presence of 0.1 g. of sodium hydroxide, at 180–200° C. This resin showed the solubilities similar to those of a product resin of Example 5, as well as very good flowability at 150° C. which did not deteriorate after the lapse of time.

EXAMPLE 9

An epoxy resin IX of 810 epoxy equivalents having a melting point of 89° C. was obtained by reacting 1440 g. of tetrabromobisphenol A-bis(2,3-epoxy-2-methylpropyl) ether type resin of 360 epoxy equivalents with 110 g. of resorcinol in the presence of 0.02 g. of potassium hydroxide, at 180° C. This resin showed the properties similar to the resin prepared in Example 6.

EXAMPLE 10

An epoxy resin X of 552 epoxy equivalents having a melting point of 71° C. was prepared by reacting 840 g. of epoxy resin A with 200 g. of bis(2-hydroxyphenyl) methane, in the presence of 0.05 g. of potassium hydroxide, at 180–200° C. This resin was easily soluble in such widely used solvents as ketone-, ester-, and glycol monoether-type solvents as well as in dioxane and tetrahydrofuran, and also had good flowability at 120° C. No de-

EXAMPLE 11

An epoxy resin XI of 890 epoxy equivalents having a melting point of 98° C. was prepared by reacting 1260 g. of epoxy resin A with 400 g. of 2-hydroxyphenyl-4-hydro- of epoxy resin A with 400 g. of 2-hydroxyphenyl-3-hydroxyphenyl-methane, in the presence of 0.04 g. of lithium hydroxide, at 180–200° C. This resin exhibited similar solubility and melt flowability properties of the epoxy resin X obtained in Example 10.

EXAMPLE 12

An epoxy resin XII of 535 epoxy equivalents having a melting point of 70° C. was prepared by reacting 840 g. of epoxy resin A with 200 g. of mixed bis(hydroxyphenyl)methane of the composition below, in the presence of 0.05 g. of sodium hydroxide, at 180–200° C. This resin showed similar solubility and melt flowability properties of the epoxy resin X.

Composition of mixed bis(hydroxyphenyl)methane:

| | Wt. percent |
|---|---|
| Bis(2-hydroxyphenyl)methane | 10 |
| Bis(4-hydroxyphenyl)methane | 41 |
| 2-hydroxyphenyl-4-hydroxyphenylmethane | 49 |

EXAMPLE 13

An epoxy resin XIII of 872 epoxy equivalents having a melting point of 100° C. was prepared by reacting 1260 g. of epoxy resin A with 400 g. of the mixed bis(hydroxyphenyl)methane specified in Example 12, in the presence of 0.05 g. of lithium chloride, at 180–200° C. This resin exhibited similar solubility and melt-flowability properties to that of the epoxy resin X.

EXAMPLE 14

An epoxy resin XIV of 1220 epoxy equivalents having a melting point of 115° C. was obtained by mixing 1070 g. of epoxy resin XII of Example 12 with 114 g. of bisphenol A, and reacting them at 180–200° C. without adding any reaction accelerator. This resin had similar solubility and melt-flowability properties to that of epoxy resin X.

EXAMPLE 15

An epoxy resin XV of 910 epoxy equivalents having a melting point of 96° C. was prepared by reacting 1440 g. of tetrabromobisphenol A-bis(2,3-epoxy-2-methylpropyl) ether type epoxy resin of 360 epoxy equivalents with 200 g. of 2-hydroxyphenyl-4-hydroxyphenyl methane, in the presence of 0.05 g. of potassium hydroxide, at 180–200° C. This resin exhibited solubility and melt-flowability properties similar to that of epoxy resin X.

EXAMPLE 16

An epoxy resin XVI of 532 epoxy equivalents having a melting point of 72° C. was prepared by reacting 840 g. of epoxy resin A with 200 g. of bis(4-hydroxyphenyl)methane, in the presence of 0.05 g. of potassium hydroxide, at 180° C. This resin was soluble in the commonly used solvents such as ketone-, ester-, and glycol ether-type solvents, and had excellent melt-flowability at 120° C. No deterioration in the flowability was observed after passage of time.

EXAMPLE 17

An epoxy resin XVII of 886 epoxy equivalents having a melting point of 98° C. was prepared by reacting 1,188 g. of bis(2,3-epoxy-2-methylpropyl) ether type resin (198 epoxy equivalents) of the mixed bis(hyroxyphenyl)methane employed in Example 12 with 456 g. of bisphenol A, in the presence of 0.1 g. of sodium hydroxide. This resin exhibited solubility and melt-flowability properties similar to that of epoxy resin X, and was soluble also in such widely used solvents as benzene and toluene.

EXAMPLE 18

An epoxy resin XVIII of 568 epoxy equivalents having a melting point of 79° C. was prepared by reacting 840 g. of epoxy resin A with 242 g. of 2,2-bis(4-hydroxyphenyl) butane, in the presence of 0.05 g. of potassium hydroxide, at 180° C. This resin was soluble in such widely used solvents as ketone-, ester-, and glycol monoether-type solvents as well as in dioxane, tetrahydrofuran, dimethylformamide and dimethylsulfoxide, etc., and had excellent melt-flowability at 120° C. No deterioration in the flowability was observed after the lapse of time.

EXAMPLE 19

An epoxy resin XIX of 911 epoxy equivalents having a melting point of 108° C. was prepared by reacting 1,260 g. of epoxy resin A with 484 g. of 2,2-bis(4-hydroxyphenyl) butane, in the presence of 0.05 g. of lithium naphthenate, at 180–200° C. This resin exhibited similar solubility and melt-flowability properties to that of epoxy resin XVIII.

EXAMPLE 20

An epoxy resin XX of 938 epoxy equivalents having a melting point of 102° C. was prepared by reacting 1,260 g. of epoxy resin A with 540 g. of 2,2-bis(4-hydroxyphenyl) hexane, in the presence of 0.1 g. of sodium hydroxide, at 180–200° C. This resin showed similar solubility and melt-flowing properties to that of epoxy resin XVIII.

EXAMPLE 21

An epoxy resin XXI of 592 epoxy equivalents having a melting point of 78° C. was prepared by reacting 840 g. of epoxy resin A with 268 g. of 1,1-bis(4-hydroxyphenyl) cyclohexane, in the presence of 0.2 g. of benzyldimethylamine, at 180–200° C. This resin showed similar solubility and melt-flowing properties similar to that of epoxy resin XVIII.

EXAMPLE 22

An epoxy resin XXII of 1,420 epoxy equivalents having a melting point of 127° C. was prepared by mixing 1,184 g. of epoxy resin XXI with 114 g. of bisphenol A, and reacting them at 180–200° C., without adding any reaction accelerator. This resin exhibited similar solubility and melt-flowing properties similar to that of epoxy resin XVIII.

EXAMPLE 23

An epoxy resin XXIII of 902 epoxy equivalents having a melting point of 98° C. was prepared by reacting 1,440 g. of tetrabromobisphenol A-bis(2,3-epoxy - 2 - methylpropyl) ether type epoxy resin of 360 epoxy equivalents with 270 g. of 2,2-bis(4-hydroxyphenyl) hexane, in the presence of 0.05 g. of potassium hydroxide, at 180–200° C. This resin showed similar solubility and melt-flowing properties similar to that of epoxy resin XVIII.

EXAMPLE 24

An epoxy resin XXIV of 1,860 epoxy equivalents having a melting point of 135° C. was prepared by reacting 1,218 g. of 1,1-bis(4 - hydroxyphenyl) ethane-bis(2,3-epoxy-2-methylpropyl) ether type epoxy resin of 203 epoxy equivalents with 558 g. of bisphenol A, in the presence of 0.1 g. of potassium hydroxide, at 180–200° C. This resin showed the similar solubility and melt-flowability characteristics to that of epoxy resin XVIII.

EXAMPLE 25

An epoxy resin XXV of 531 epoxy equivalents having a melting point of 70° C. was prepared by reacting 840 g. of epoxy resin A with 110 g. of resorcinol at 150° C. for 3 hours, and then at 180° C. This resin exhibited similar solubility and melt-flowing properties to that of epoxy resin I.

EXAMPLE 26

An epoxy resin XXVI of 550 epoxy equivalents having the melting point of 72° C. was prepared by reacting 840 g. of epoxy resin A with 200 g. of the mixed bis(hydroxyphenyl) methane employed in Example 12 at 180–200° C. This resin exhibited similar solubility and melt-flowing properties to that of epoxy resin XII.

EXAMPLE 27

An epoxy resin XXVII of 915 epoxy equivalents having a melting point of 96° C. was prepared by reacting 1,400 g. of tetrabromobisphenol A-bis(2,3-epoxy - 2 - methyl-propyl) ether type epoxy resin of 360 epoxy equivalents with 200 g. of 2-hydroxyphenyl-4-hydroxyphenyl methane at 180–200° C.

EXAMPLE 28

An epoxy resin XXVIII of 512 epoxy equivalents having a melting point of 80° C. was prepared by reacting 880 g. of bis(4-hydroxyphenyl) sulfone-bis(2,3-epoxy-2-methylpropyl) ether type epoxy resin of 220 epoxy equivalents with 110 g. of resorcinol at 180° C. This resin exhibited similar solubility and melt-flowing properties to that of epoxy resin X.

Control

An epoxy resin of 550 epoxy equivalents having a melting point of 72° C. was prepared by reacting 840 g. of epoxy resin A with 228 g. of bisphenol A, in the presence of 0.04 g. of potassium hydroxide, at 180–200° C. This resin was completely insoluble in such commonly used solvents as ketone-, ester-, glycol ether-, glycol ether acetate-, diethylene glycol monoether-, and halogenated hydrocarbon-type solvents and dioxane, etc., not speaking of alcoholic and hyrocarbon type solvents. The resin was once soluble in tetrahydrofuran, dimethylformamide and dimethylsulfoxide, but the solutions invariably produce turbidity within a week on standing. When the resin was maintained at 120° C., it melted once and exhibited good flowability, but solidified within approximately 30–60 minutes, showing absolutely no flowability. The resin once thus solidified could not be re-melted, unless heated to 180–200° C. or even higher.

What is claimed is:

1. A process for the preparation of an epoxy resin of excellent melt-flowability and solubility which is solid at room temperature, comprising the preparation of a bis(2,3-epoxy-2-methylpropyl) ether type epoxy resin of dihydric phenol by condensation of 1,2-epoxy-3-haloisobutane with a dihydric phenol, the characteristic features residing in that less than 10 mol percent of a symmetric dihydric phenol and at least 10 mol percent of an asymmetric dihydric phenol are used concurrently as the dihydric phenol component, said symmetric dihydric phenol being selected from the group consisting of:
2,2-bis(4-hydroxyphenyl) propane,
2,2-bis(4-hydroxyphenyl) sulfone, and
nucleus halogen-substituted compounds thereof, and
the asymmetric dihydric phenol being selected from the group consisting of:
(A′) pyrocatechol, resorcinol, bis(hydroxyphenyl) methane, and nucleus substituted compounds thereof,
(A″) dihydroxynaphthalene and dihydroxyanthracene, and
(‴) the compounds of the general formulae:

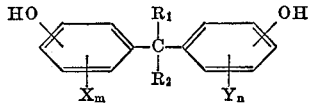

and

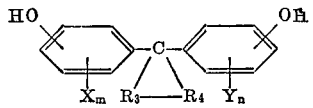

in which $R_1$ and $R_2$ are selected from the group consisting of a hydrogen atom, alkyl, aryl, and alkylaryl radicals, respectively, and are mutually different,
—$R_3$—$R_4$ is an alkylene radical,
X and Y are as member of the group consisting of alkyl and alkoxy radicals and halogen atoms, respectively, and
$m$ and $n$ are zero or an integer of 1 to 4.

2. The process of claim 1, in which the symmetric dihydric phenol is a member of the group consisting of
2,2-bis(4-hydroxyphenyl) propane,
2,2-bis(4-hydroxyphenyl) sulfone,
2,2-bis(3,5-dichloro-4-hydroxyphenyl) propane,
2,2-bis(3,5-dichloro-4-hydroxyphenyl) sulfone,
2,2-bis(3,5-dibromo-4-hydroxyphenyl) propane, and
2,2-bis(3,5-dibromo-4-hydroxyphenyl) sulfone.

3. The process of claim 1, in which the asymmetric dihydric phenol is a member of the group consisting of pyrocatechol, tertiary butylcatechol, ditertiary butylcatechol, octylcatechol, and chlorocatechol.

4. The process of claim 1, in which the asymmetric dihydric phenol is a member of the group consisting of resorcinol, methylresorcinol, tertiary butylresorcinol, and octylresorcinol.

5. The process of claim 1, in which the asymmetric dihydric phenol is a member of the group consisting of
bis(4-hydroxyphenyl) methane,
bis(2-hydroxyphenyl) methane,
2-hydroxyphenyl-4-hydroxyphenyl-methane,
1,1-bis(4-hyroxyphenyl) ethane,
2,2-bis(4-hydroxyphenyl) butane,
2,2-bis(4-hydroxyphenyl) pentane,
2,2-bis(4-hydroxyphenyl) hexane,
2,2-bis(4-hydroxyphenyl) octane,
α,α-bis(4-hydroxyphenyl) ethylbenzene,
1,1-bis(4-hydroxyphenyl) cyclopentane, and
1,1-bis(4-hydroxyphenyl) cyclohexane.

6. The process of claim 1, in which the asymmetric dihydric phenol is 1,6-dihydroxynaphthalene or 1,8-dihydroxyanthracene.

References Cited

UNITED STATES PATENTS

| | | | |
|---|---|---|---|
| 2,857,362 | 10/1958 | Shepherd Jr. et al. | 260—47 |
| 3,422,063 | 1/1969 | Barton et al. | 260—47 |
| 2,181,085 | 11/1939 | Alquist et al. | 260—47 X |

WILLIAM H. SHORT, Primary Examiner

T. E. PERTILLA, Assistant Examiner

U.S. Cl. X.R.

260—49, 348 C